(12) United States Patent
Heinloth et al.

(10) Patent No.: US 8,366,359 B2
(45) Date of Patent: Feb. 5, 2013

(54) METHOD FOR MACHINING CRANKSHAFTS AND DEVICE FOR CARRYING OUT THIS METHOD

(75) Inventors: Markus Heinloth, Postbauer-Heng (DE); Jürgen Zastrozynski, Düsseldorf (DE)

(73) Assignee: Kennametal Widia Produktions GmbH & Co. KG, Essen (DE)

( * ) Notice: Subject to any disclaimer, the term of this patent is extended or adjusted under 35 U.S.C. 154(b) by 1032 days.

(21) Appl. No.: 11/988,428

(22) PCT Filed: Jul. 7, 2006

(86) PCT No.: PCT/DE2006/001172
§ 371 (c)(1),
(2), (4) Date: Jan. 7, 2008

(87) PCT Pub. No.: WO2007/006275
PCT Pub. Date: Jan. 18, 2007

(65) Prior Publication Data
US 2009/0232612 A1 Sep. 17, 2009

(30) Foreign Application Priority Data
Jul. 11, 2005 (DE) .................. 10 2005 032 552
Aug. 9, 2005 (DE) .................. 10 2005 038 021

(51) Int. Cl.
*B23C 3/00* (2006.01)
(52) U.S. Cl. ........................................ 409/132
(58) Field of Classification Search ............ 409/132, 409/204, 131, 165, 61, 234; 407/113, 119
See application file for complete search history.

(56) References Cited

U.S. PATENT DOCUMENTS

| 5,833,410 A | 11/1998 | Lim |
| 6,050,757 A | 4/2000 | Gesell |
| 6,374,472 B1 | 4/2002 | Ramold |
| 6,805,520 B2 | 10/2004 | Gesell |
| 7,275,895 B2 | 10/2007 | Heinloth |
| 2003/0143045 A1* | 7/2003 | Gessell et al. .................. 409/64 |
| 2006/0002779 A1 | 1/2006 | Bauer |

FOREIGN PATENT DOCUMENTS

| DE | 10333621 | * 2/2005 |
| EP | 0 542 026 | 5/1993 |
| JP | 05050315 | 2/1993 |
| JP | 2001219313 | 8/2001 |
| JP | 2004230526 | 8/2004 |

* cited by examiner

*Primary Examiner* — John C Hong
(74) *Attorney, Agent, or Firm* — Larry R. Meenan, Esq.

(57) ABSTRACT

The invention relates to a method for machining crankshafts during which the machining of the bearing width and of the oil collar should be carried out simultaneously. To this end, a disk-shaped outer milling cutter having a number of cutting tools (10, 14) is used of which a portion serves to machine a bearing base of the crankshaft and the other portion serves to machine an oil collar adjacent to the bearing base. According to the invention, a set angle (κ) for the cutting tools for machining the oil collar is selected according to the actual dimension, during which the effective depth of cut $h_{max}$ for each cutting insert is limited to a predeterminable maximum value. The invention also relates to a device for carrying out this method.

20 Claims, 5 Drawing Sheets

SECTION C-C

METHOD FOR MACHINING CRANKSHAFTS AND DEVICE FOR CARRYING OUT THIS METHOD

CROSS REFERENCE TO RELATED APPLICATIONS

Figure 4:
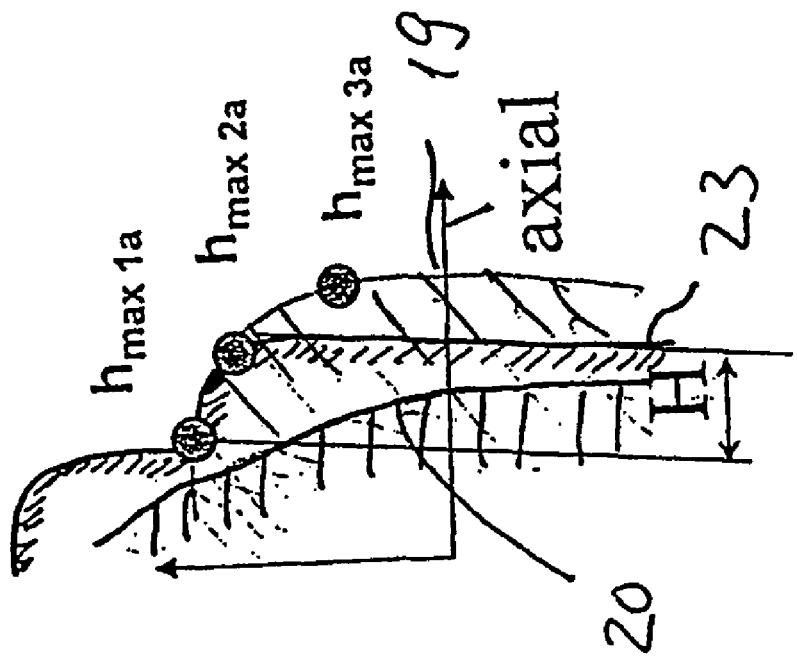

This application is the U.S. national phase of PCT application PCT/DE2006/001172, filed 7 Jul. 2006, published 18 Jan. 2007 as WO 2007/006275, and claiming the priority of German patent application 102005032552.1 itself filed 11 Jul. 2005 and German patent application 102005038021.2 itself filed 9 Aug. 2005, whose entire disclosures are herewith incorporated by reference.

The invention relates to a method of machining crankshafts where machining of the bearing width and of the oil flange are designed to be carried out sequentially or simultaneously, to which end a disk-shaped external milling cutter having multiple cutting tools is used, whose one portion is used to machine a bearing surface of the crankshaft and whose other portion is used to machine an oil flange adjacent the crankpin surface. The invention further relates to an apparatus for carrying out the method by use of a disk-shaped external milling cutter that on its external periphery has tangentially and laterally clamped cutting inserts.

The machining of crankshafts is difficult because as a result of its length the crankshaft is an unstable workpiece having eccentric rotationally symmetrical surfaces where the surfaces of the crankpins and cheek surfaces, including the oil flange, must be machined. Several methods have been proposed according to the prior art for machining crankshafts, such as turning, internal milling, turn broaching, turning/turn broaching, or external milling, of which external milling is frequently used. To allow economical large-scale manufacture of crankshafts with short machining times, a milling process is proposed in EP 0 830 228 [U.S. Pat. No. 6,374,472], for example, in which the machining is carried out using an external milling cutter at cutting speeds of greater than 160 m/min and cut depths in a range of 0.1 mm to 0.3 mm and a small cutting arc length of the external milling cutter carrying the cutting inserts. Tangentially clamped positive cutting inserts are used for machining the crankpins. This high-speed milling of crankshafts has significant cost advantages, since it is possible to greatly reduce the crankshaft machining time. For the machining costs, however, additional factors are crucial (not discussed here), namely, the wear resistance of the cutting inserts, which determines the service life of the tool edges, and the cycle time of the tool, i.e. the sequence of the various cutting steps and the number of tool edges working in each cutting step.

According to the prior art, the crankpin surfaces (bearing width) and the oil flange are machined by successive cutting tools, only one cut being by each advance, depending on the offset of the crankshaft. In some cases, however, the corner radius to be produced is smaller than the size for the oil flange, resulting in a higher maximum depth of cut in certain cutting regions, leading to correspondingly high wear of the cutting inserts in question. Overloading of tool edges (cutting edges) of individual cutting inserts makes this cutting insert unusable, so that it is necessary to replace a tool, regardless of the wear condition of the tool edges of other cutting inserts, which greatly influences the cycle times and thus the machining costs per crankshaft.

The object of the present invention, therefore, is to provide an apparatus and a method where the cutting forces are minimized to spare the laterally clamped cutting inserts.

This object is achieved by a method according to claim 1 and an apparatus according to claim 3.

According to the invention, an attack angle κ for the cutting tools for machining the oil flange is selected as a function of the actual size, the effective depth of cut $h_{max}$ for each cutting insert being limited to a predeterminable maximum value. To this end, the laterally clamped cutting inserts are mounted in tool cassettes, for example, to allow adjustment of the attack angle.

According to one refinement of the method according to the invention, for further reduction of the effective depth of cut the number of cutting tools for machining the oil flange is increased, preferably doubled, which results in a reduction of the effective maximum depth of cut by half.

The advantages of this method and of the apparatus consist in an increase in the tool life and a cost reduction to minimize costs per produced piece. The milling process may be reliably set independently of the size situation, and in particular the effective depths of cut removed by the individual tools may be adapted to one another, so that the active cutting tools on the support, i.e. the disk-shaped external milling cutter, are subject to uniform load. As a whole, the entire cutting process is optimized with regard to requirements imposed by the crankshaft to be machined. In particular, the lateral cutting inserts used for the oil flange shaping may be inserted or adjusted in the tool holder in such a way that a predetermined value $h_{max\,eff}$ is achieved in each cutting operation as a function of the actual size of the crankshaft at an attack angle. If the number of active tool edges for machining the oil flange is increased, the effective cutting width may be correspondingly minimized. In the regions in which the laterally clamped cutting insert has already achieved a low effective dimension $h_{max}$ as a result of the attack angle, no additional tool edges are required.

Tool costs consist of several components. These include in particular the tool costs that, in addition to the strict manufacturing costs, are determined by the service lives. Also included are the machining times and the costs for resetting the tools. Indexable inserts have multiple usable tool edges, the number of which, however, is limited by the design. Thus, the number of usable cutting edges in a cutting insert of the above-described type is limited to four.

To allow expanded machining possibilities with a cutting edge shape, a laterally clampable cutting insert is proposed in which at least one pair of the cutting edges has a stepped shape, having two convex sections with a concave section in between, the outer convex section extending over an angular dimension of 180°.

As the result of such a cutting edge shape, stepped shapes such as an oil flange of a crankcase may be cut, and at the same time a side wall surface, the oil flange, and the crankpin corner, i.e. an undercut, may be provided.

Refinements of the cutting insert are described below.

Every two pairs of cutting edges preferably have a stepped shape, so that when the cutting insert is rotated by 180° it is rotationally symmetrical about a transverse axis or is mirror-symmetrical with respect to a center plane. This results in a total of four congruent cutting edges tat may be used in succession.

For stabilizing the cutting edges, a bevel is provided along the cutting edge that preferably is oriented at a (negative) bevel angle of −15° and/or has a bevel width of 0.1 to 0.2 mm.

The machining angle used, in particular the machining angle adjacent the bevel, is 0° to 20°, and preferably is selected to be positive 10°.

To better support the cutting insert in the tool seat, in its center region the cutting insert in each case has flat side surfaces perpendicular to the flat end faces.

As mentioned above, the radius of curvature of the cutting edge may be selected such that by use of this cutting edge a stepped-shaped shape is cut in the desired final dimensions in a single operation. In particular for crankshaft machining, for this purpose the radius of curvature is selected to be 1.5±0.1 mm in is the concave region of the cutting edge, 1.5±0.1 mm on one side in the convex region of the cutting edge, and 1.4±0.1 mm on the other side. However, other radii of curvature for the cutting edges may be used according to the invention.

Likewise, a cutting insert design may preferably be selected in which a tangent to both convex regions defines an angle of 35°±5° with the end face.

According to a further refinement of the invention, the cutting edge region extending over 180° merges into the adjacent end face via a linear cutting edge piece, this linear cutting edge piece defining an angle of ≦5° with the end face.

Lastly, according to one preferred design of the invention the convex and the concave cutting edge sections are inclined at an angle of up to 20°, preferably 10°, with respect to the longitudinal center axis of the cutting insert.

Figure 1:
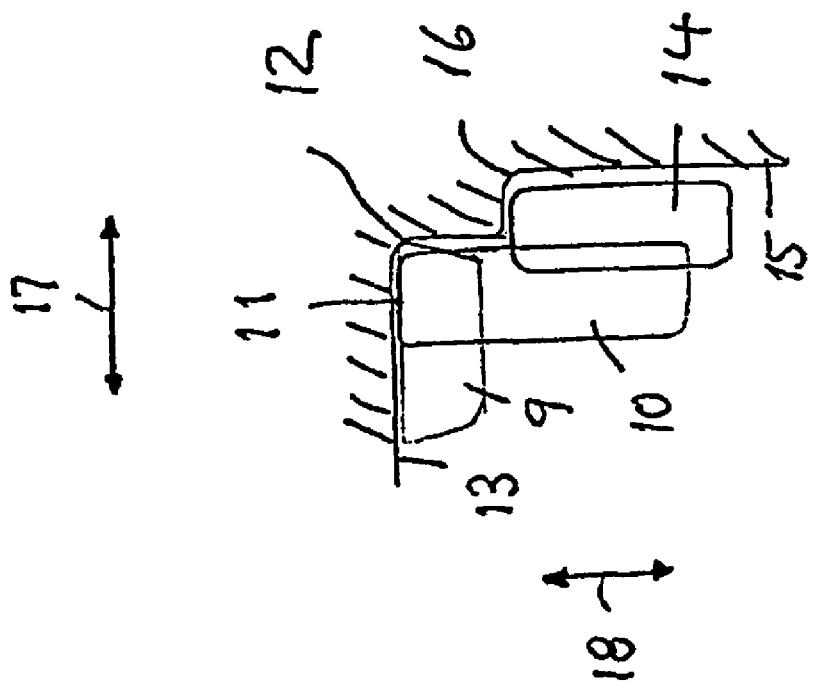
Figure 2:
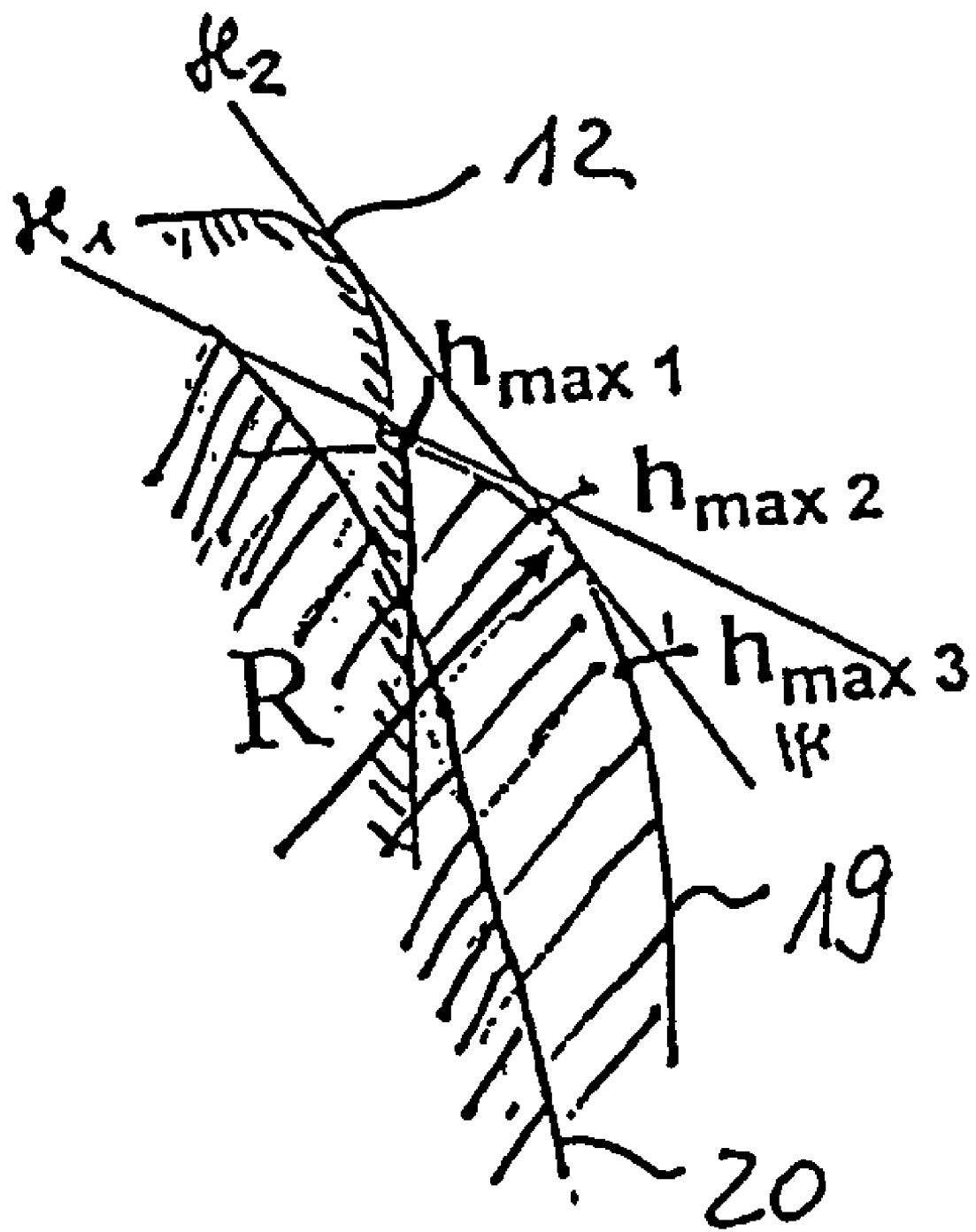
Figure 3:
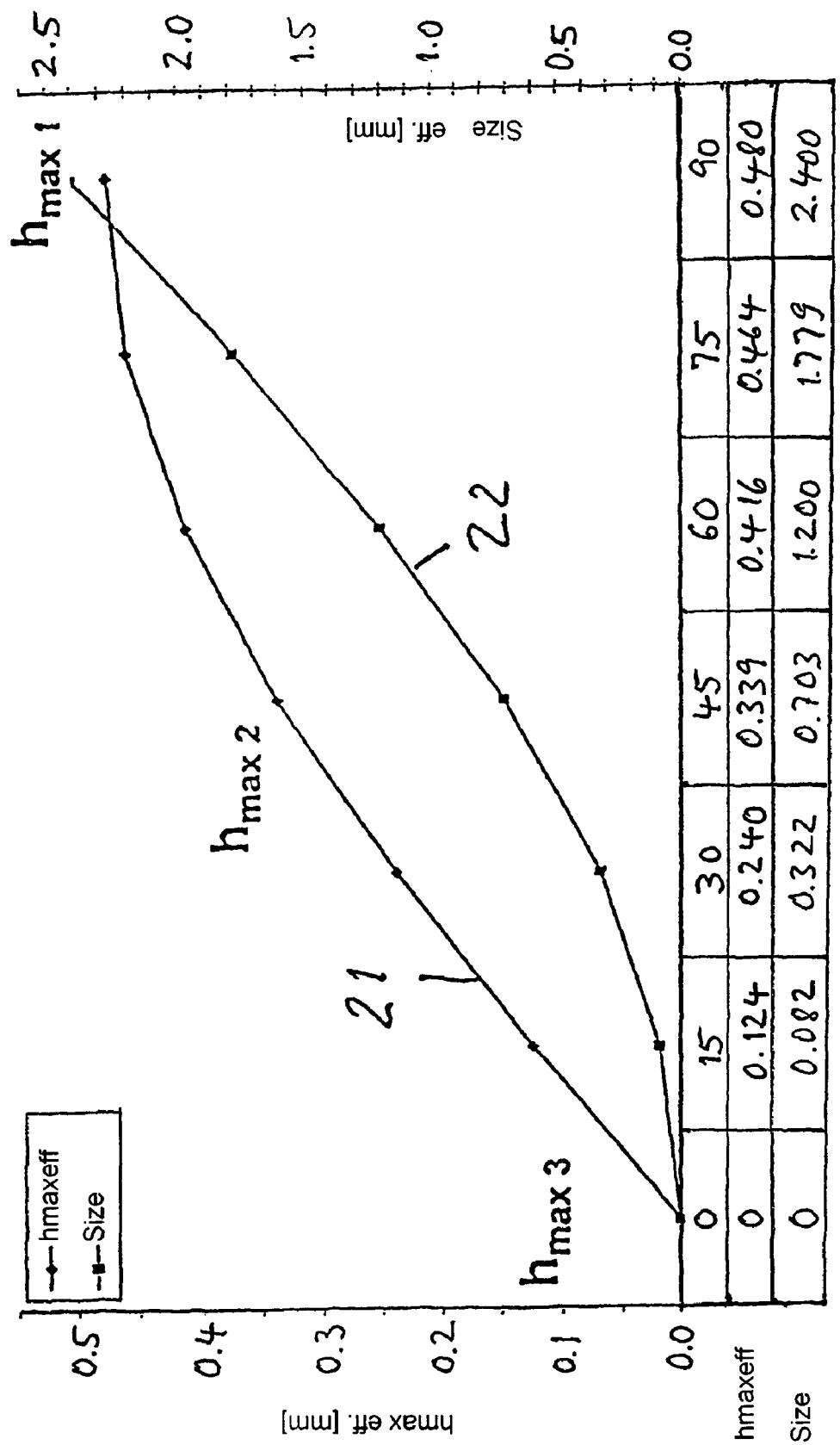
Figure 5:
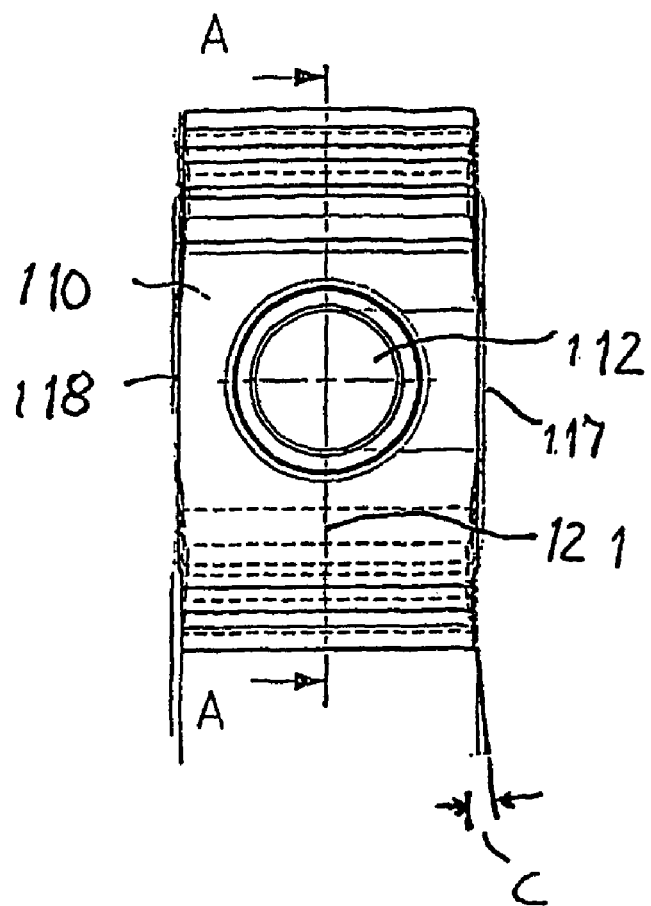
Figure 8:
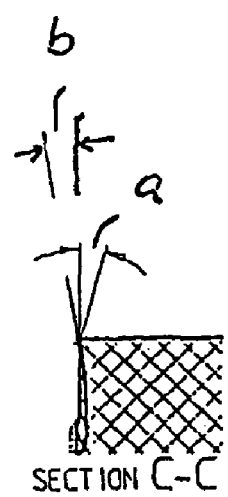
Figures 6, 9:
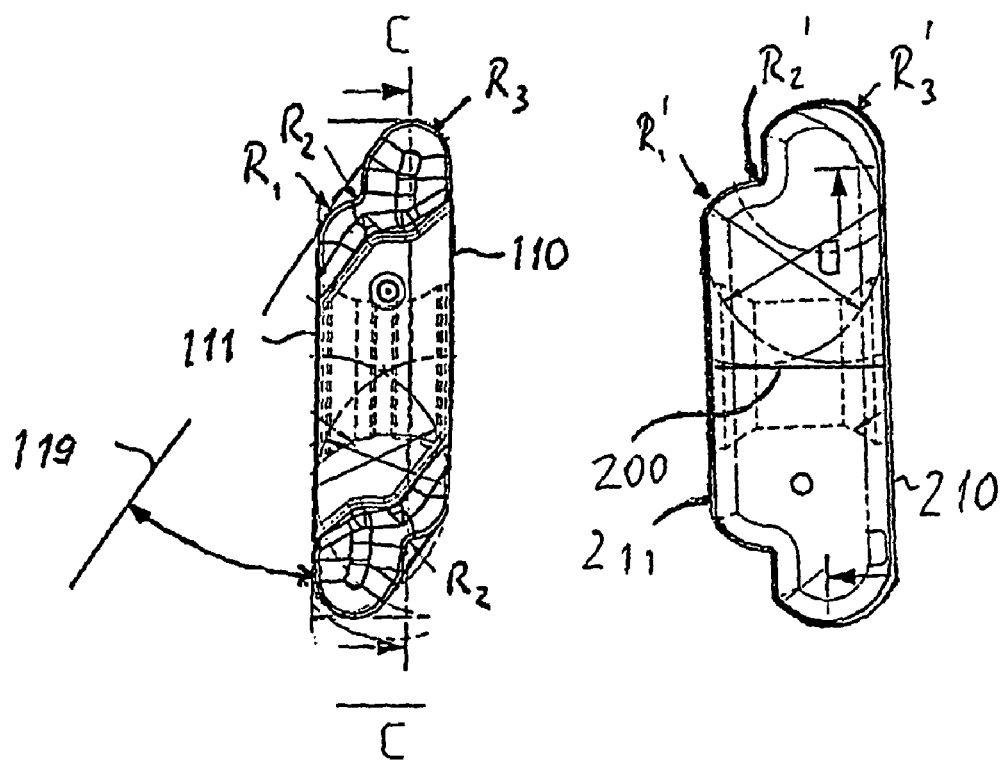
Figure 7:
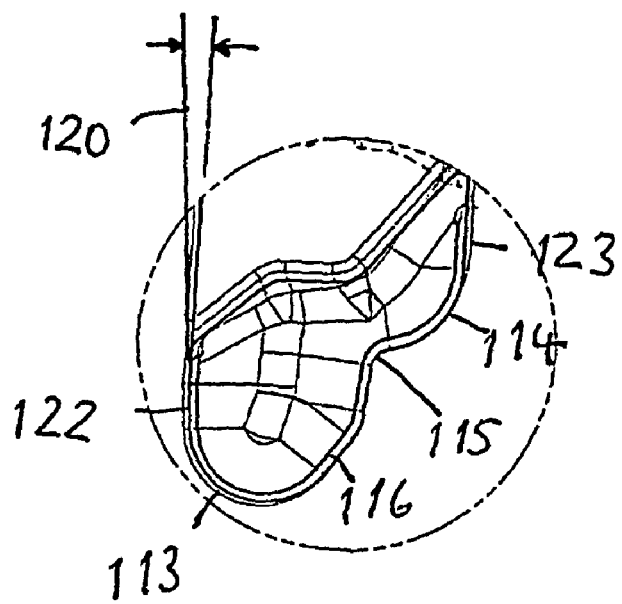

Further embodiments of the invention and advantages thereof result from the discussion below with reference to the drawings that show the following:

FIG. 1 a schematic diagram of a partial cross-sectional view of a crankshaft, together with two machining tools;

FIG. 2 a cross section through a crankshaft showing its initial shape, the shape to be produced, and the effects of the attack angle on the effective depth of cut;

FIG. 3 the dimension or depth of cut as a function of the attack angle;

FIG. 4 a further illustration of the optimized production profile according to the present invention;

FIG. 5 a top view of a laterally mounted cutting insert;

FIG. 6 a side view (with a top view of the cutting edge shapes) of the cutting insert according to FIG. 5;

FIG. 7 an enlarged illustration of a cutting edge shape of the cutting insert;

FIG. 8 a partial sectional view in the region of a cutting edge of the cutting insert; and FIG. 9 a side view of a further cutting insert.

According to the prior art, disk-shaped external milling cutters are known that on their external periphery have tangentially and radially mounted cutting tools that in each case may be used for producing the crankpin surface and the oil flange, including the adjacent side wall surface or an undercut.

According to the prior art, it is known to carry out the various cutting operations using separate milling cutters, where for each cutting operation the external milling cutter, whose rotational axis is parallel to the rotational and longitudinal axis of the crankshaft, is advanced radially to the machining site in the direction of the crankshaft. The crankshaft and the external milling cutter are both rotated, and the rotational speed of the milling cutter is much greater than that of the crankshaft. The rotational directions of the crankshaft and of the milling cutter are preferably the same during machining. All of the surface of a crankpin or a complete oil flange may be machined in the course of one milling operation as the result of different rotational speeds.

FIG. 1 shows a partial cross-sectional view of a crankshaft together with three cutting inserts, of which cutting inserts 9 and 10 with their active main tool edge 11 determine the shape of the corner radius 12 and the side surface 13. FIG. 1 also shows a cutting insert 14 used for producing the side wall surface 15 and the corner radius 16 of the oil flange. Cutting inserts 9, 10, and 14 are positioned next to additional correspondingly designed cutting tools on an external milling cutter that is situated so as to be axially movable in the direction of the double arrow 17 and radially movable in the direction of the double arrow 18. FIG. 2 shows three overlapping curves, namely, a first curve having a corner radius 12, a second curve 19 having a corner radius R and corresponding to the oil flange to be produced, and a third curve 20 that represents an oversized cross section through the crankshaft to be machined. In particular in cases in which the corner radius is smaller than the size for the oil flange, a full formation of the maximum depth of cut is automatically required for certain cutting regions. FIG. 2 illustrates different points $h_{max\ 1}$, $h_{max\ 2}$, and $h_{max\ 3}$ that are effective values. A different depth of cut H results in each case, depending on the tangent attack angle $\kappa_1$ or $\kappa_2$. This is due to the fact that, unlike. the situation for a linear cutting edge, the dimension $h_{max}$ varies according to the attack angle. FIG. 3 shows corresponding curves where the variation of $h_{max}$ in curve 21 is plotted as a function of the attack angle κ. The second curve 22 shows the size, in each case as a function of the attack angle of the cutting inserts.

The aim of the present invention is to adjust the attack angle of the cutting inserts at a known size in such a way that the effective depth of cut is made uniform; i.e. peak values in certain cutting regions are avoided. As shown in FIG. 2, in each case different attack angles necessarily result in different effective depths of cut $h_{max}$. According to one preferred design of the method according to the invention, the number of tool edges, i.e. the number of cutting inserts, is doubled in locations where the predetermined depth of cut is achieved, so that-for a constant advance rate the depth of cut is reduced by half. In the regions denoted by $h_{max\ 3}$ and $h_{max\ 3a}$ in FIGS. 2 and 4, a minimum number of tool edges is sufficient on account of the low cutting load.

For determining the large the offset H must be, resulting from the surface sections that in each case extend radially, i.e. perpendicular to the axial direction, the radius R of the curve 19 shown in FIG. 2 that determines the value $h_{max}$ that is present at a given point [is used], since this radius as well as the size before starting the machining are known, and an essentially uniform depth of cut that fluctuates by a maximum of 30% about a predetermined value may be achieved by targeted adjustment of the attack angle κ. By use of this measure, individual cutting force overloads on discrete cutting edges are avoided, thereby allowing the service life of the entire set of cutting inserts, which is determined by the "weakest link," to be increased.

For producing the shape according to curve 23, a cutting insert 10 may also be used that is precompressed and sintered, but not finish machined. The tool 14 used for cutting the shape 19 advances the tool 10 forward both axially and radially, so that this cutting insert should be ground to a precise shape.

FIGS. 5 through 8 illustrate a cutting insert that replaces the laterally clamped cutting-inserts 10 and 14 since, due to its stepped cutting edges, the cutting insert is able to cut the entire-shape of the side wall surface and of the oil flange up to the corner radius 12 while advancing radially. Undercuts may also be produced by rotation of the cutting insert through 180°.

The cutting insert shown in FIGS. 5 through 8 has two parallel, flat end faces 110, 111 through which a bore 112 passes. This bore is used for accommodating a mounting bolt by means of which the cutting insert is radially, i.e. laterally, affixed to a side milling cutter. At their shorter edges the end faces 110, 111 merge into rounded end edges, each of which is laterally delimited by cutting edges. The cutting edges have a stepped shape, and are composed of two convex cutting edge sections 113 and 114 and. a concave cutting edge section 15 [sic; 115] situated between them. Radii $R_1$ and $R_3$ for the convex cutting edge sections may be equal, for example 1.5 mm, or may be different. The same applies for the radius $R_2$ of the concave cutting edge section.

The cutting insert has a bevel 116 that extends along the cutting edge sections 113 through 115. This bevel is inclined at a bevel angle a of −15°. The machining angle b, also shown in FIG. 8, is +10°. The bevel width is 0.15 mm, for example.

In the center region are provided flat side surfaces 117, 118, each perpendicular to the flat end faces 110 and 111.

In the special shape shown in the figures, a common tangent 119 of the convex cutting edge sections 113 and 114 defines an angle of approximately 35° with the respective end face 110, 111. Furthermore, FIG. 7 shows a tangent 20 [sic; 120] to the tapering section of cutting edge section 113 at the transition to the respective end face. This tangent 120 defines an angle of approximately 4° with the end face.

According to-the illustration in FIG. 5, cutting edges 113 through 115 are inclined by an angle of inclination c, preferably less than or equal to 10°, with respect to a longitudinal center axis 121 of the cutting insert.

The cutting insert has a total of four actively usable cutting edges by means of which in particular stepped oil flange shapes may be machined, either the tapering sections 122 or 123 being used for producing the side wall surface shape, depending on the clamping direction of the cutting insert.

The cutting insert shown in FIG. 9 differs from the cutting insert according to FIGS. 5 through 8 essentially in that it is rotationally symmetrical not with respect to an axis, but, rather, with respect to the cross-sectional plane 200. This results in a longer end face 210 and a shorter end face 211. In addition, for a concave radius $R_2'$, less than 0.5 mm the convex radii $R_3'$ and $R_1'$ of approximately 2.3 mm are correspondingly selected to be different for another cutting objective.

The above-described cutting insert may have cutting shapes and cutting guide elements on the machining surface in the form of depressions or elevations. The cutting insert is composed of a hard metal or a cermet material that may be optionally coated. Typical coating materials are carbides, nitrides, and oxides of the IVa to VIa metals as well as aluminum oxide, but also diamond coatings.

The invention claimed is;

1. An apparatus for simultaneous machining a crankshaft comprising a disk-shaped external milling cutter with an external periphery having a tangentially mounted cutting insert and a laterally mounted cutting insert, the tangentially mounted cutting insert being used for machining a side surface of the crankshaft, and the laterally mounted cutting insert being used for machining an oil flange adjacent the side surface, wherein an attack angle (κ) of each cutting insert is adjusted during a machining operation in such as way that an effective depth of cut, $h_{max}$, for each cutting insert is limited to a predeterminable maximum value.

2. The apparatus according to claim 1, wherein a number of laterally mounted cutting inserts for machining the oil flange is doubled so as to reduce the effective depth of cut, $h_{max}$, for each laterally mounted cutting insert by one-half.

3. The apparatus according to claim 1, wherein the lateral mounted cutting insert has a first planar end face, an opposing second planar end face parallel to the first planar end face, a bore traversing the first and second planar end faces, a first planar side face perpendicular to the first planar end face, an opposing second planar side face perpendicular to the second planar end face, wherein each end of the first and second planar side faces terminating at a cutting edge, each cutting edge including a first convex cutting edge section, a second convex cutting edge section and a concave cutting edge section between the first and second convex cutting edge sections, wherein the first convex cutting edge section extends entirely between the first planar end face and the concave cutting edge section, and wherein the second convex cutting edge section extends entirely between the second planar end face and the concave cutting edge section.

4. The apparatus according to claim 3, wherein the first convex cutting edge section is formed with a first radii (R3), the second convex cutting edge section is formed with a second radii (R2), and the concave cutting edge section is formed with a third radii (R1).

5. The apparatus according to claim 4, wherein the first and second radii are equal to each other, and wherein the third radii is different than the first and second radii.

6. The apparatus according to claim 4, wherein the first, second and third radii are different from each other.

7. The apparatus according to claim 3, wherein the first convex cutting edge section includes a first tapering section defining a tangent between the first convex cutting edge section and the first planar end face.

8. The apparatus according to claim 3, wherein the second convex cutting edge section includes a second tapering section defining a tangent between the second convex cutting edge section and the second planar end face.

9. The apparatus according to claim 3, wherein the first convex cutting edge section, the second convex cutting edge section and the concave cutting edge section are formed at an angle of inclination, c, with respect to a central, longitudinal axis of the cutting insert.

10. The apparatus according to claim 9, wherein the angle of inclination, c, is less than or equal to 10 degrees.

11. The apparatus according to claim 3, further comprising a bevel extending along the first convex cutting edge section, the second convex cutting edge section and the concave cutting edge section.

12. The apparatus according to claim 11, wherein the bevel is inclined at a bevel angle, a, of −15 degrees.

13. The apparatus according to claim 3, wherein a tangent extending along the first convex cutting edge section and the second convex cutting edge section forms an angle with respect to the first and second planar end faces.

14. The apparatus according to claim 13, wherein the angle is 35 degrees.

15. The apparatus according to claim 3, wherein the first planar end face has a different length than the second planar end face.

16. A cutting insert comprising a first planar end face, an opposing second planar end face parallel to the first planar end face, a bore traversing the first and second planar end faces, a first planar side face perpendicular to the first planar end face, an opposing second planar side face perpendicular to the second planar end face, wherein each end of the first and second planar side faces terminating at a cutting edge, each cutting edge including a first convex cutting edge section, a second convex cutting edge section and a concave cutting edge section between the first and second convex cutting edge sections, wherein the first convex cutting edge section extends entirely between the first planar end face and the concave cutting edge section, and wherein the second convex cutting edge section extends entirely between the second planar end face and the concave cutting edge section.

17. The cutting insert according to claim 16, wherein the first convex cutting edge section includes a first tapering section defining a tangent between the first convex cutting edge section and the first planar end face, and wherein the second convex cutting edge section includes a second tapering section defining a tangent between the second convex cutting edge section and the second planar end face.

18. The cutting insert according to claim 16, wherein the first convex cutting edge section, the second convex cutting edge section and the concave cutting edge section are formed at an angle of inclination, c, with respect to a central, longitudinal axis of the cutting insert.

19. A method for simultaneous machining a crankshaft using a disk-shaped external milling cutter with an external periphery having a tangentially mounted cutting insert and a laterally mounted cutting insert, the tangentially mounted cutting insert being used for machining a side surface of the crankshaft, and the laterally mounted cutting insert being used for machining an oil flange adjacent the side surface, the method comprising adjusting an attack angle (κ) of each cutting insert during a machining operation in such as way that an effective depth of cut, $h_{max}$, for each cutting insert is limited to a predeterminable maximum value.

20. The method according to claim 19, wherein a number of laterally mounted cutting inserts for machining the oil flange is doubled so as to reduce the effective depth of cut, $h_{max}$, for each laterally mounted cutting insert by one-half.

\* \* \* \* \*